United States Patent [19]

Mukaekubo

[11] Patent Number: 4,857,784
[45] Date of Patent: Aug. 15, 1989

[54] MOTOR HAVING ROTATION SPEED DETECTION MECHANISM

[75] Inventor: Jyunichi Mukaekubo, Fuji, Japan

[73] Assignee: Kabushiki Kaisha Toshiba, Kawasaki, Japan

[21] Appl. No.: 125,283

[22] Filed: Nov. 25, 1987

[30] Foreign Application Priority Data

Nov. 27, 1986 [JP] Japan ................... 61-280604

[51] Int. Cl.$^4$ ............................ H02K 37/00
[52] U.S. Cl. .................. 310/68 B; 310/49 R
[58] Field of Search ............ 310/49 R, 68 B, 68 C, 310/68 R; 318/254

[56] References Cited

U.S. PATENT DOCUMENTS

| | | | |
|---|---|---|---|
| 3,772,544 | 11/1973 | Wrobel | 310/71 |
| 4,259,603 | 3/1981 | Uchiyama et al. | 310/68 B |
| 4,492,906 | 1/1985 | Goto | 310/68 B |
| 4,675,585 | 6/1987 | Krueger et al. | 318/358 |

FOREIGN PATENT DOCUMENTS 55-62181 4/1980 Japan .
61-164485 7/1986 Japan .

*Primary Examiner*—Patrick R. Salce
*Assistant Examiner*—Judson H. Jones
*Attorney, Agent, or Firm*—Cushman, Darby & Cushman

[57] ABSTRACT

A motor, wherein a space is established between a rotor and a bracket, includes a rotation speed detection mechanism disposed in the space for detecting the rotation speed of the rotor. This construction may reduce the size of the overall assembly of the motor having the rotation speed detection mechanism.

3 Claims, 3 Drawing Sheets

MOTOR HAVING ROTATION SPEED DETECTION MECHANISM

BACKGROUND OF THE INVENTION

1. Field of the Invention

The present invention relates to motors wherein a rotation speed detection mechanism including a magnet and a magnetic sensor is employed for detecting the rotation speed of the motor.

2. Description of the Prior Art

Air conditioning apparatus are typically provided with a fan device for generating an air stream flowing through a heat exchanger and into a room to be cooled or heated. The fan device is rotated by a motor, the rotation speed of which is detected by a rotation speed detection mechanism. The rotation speed of the motor is varied in response to the temperature of the room.

One example of a rotation speed detection mechanism is shown in Japanese Utility Model Laid-open Publication No. 62181/1980 laid open to public inspection on Apr. 26, 1980. In this prior art, a rotation plate is fixed on a rotation axis of a motor. The outer surface of the rotation plate is magnetized with alternating N-poles and S-poles. A circuit substrate for the motor faces the rotation plate. A Hall-effect IC is fixed on the substrate such that the detection surface of the Hall-effect IC 5 is opposite to the outer surface of the rotation plate. The Hall-effect IC includes a Hall element for generating a rotation detection signal which has a frequency responding to the rotation speed of the motor.

In the construction described above, since the rotation detection mechanism including the rotation plate and the Hall-effect IC is provided outside of the motor, an overall assembly of the motor is large. However, it has been desired to reduce the thickness of air conditioning devices in recent years. Taking such desire into consideration, a compact motor including a rotation speed detection mechanism is desired in air conditioning apparatus.

SUMMARY OF THE INVENTION

It is an object of the present invention to reduce a size of an overall assembly of a motor which includes a rotation speed detection mechanism.

It is another object of the invention to accurately detect the rotation speed of a motor.

To accomplish the above objects, a motor has a space between a rotor and a bearing. The motor includes a rotation speed detection mechanism disposed in the space for detecting the rotation speed of the rotor. The rotation speed detection mechanism may include a magnet fixed on the rotation shaft of the rotor, and a magnetic sensing element disposed close to the magnet for outputting a sensing signal representing the rotation speed of the rotor in response to the rotation of the magnet.

BRIEF DESCRIPTION OF THE DRAWINGS

The present invention is best understood with reference to accompanying drawings in which.

DETAILED DESCRIPTION OF THE PREFERRED EMBODIMENTS

Referring to the accompanying drawings, one embodiment of the present invention will be described.

Figure 1:
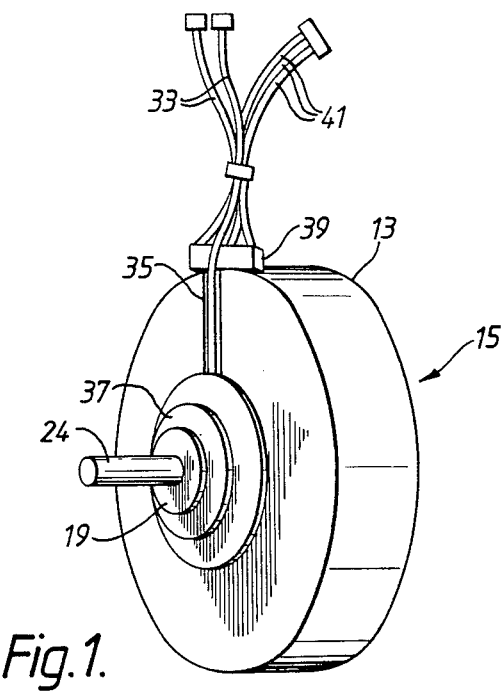
FIG. 1 is a perspective view illustrating a motor of a first embodiment of the present invention.
Figure 2:
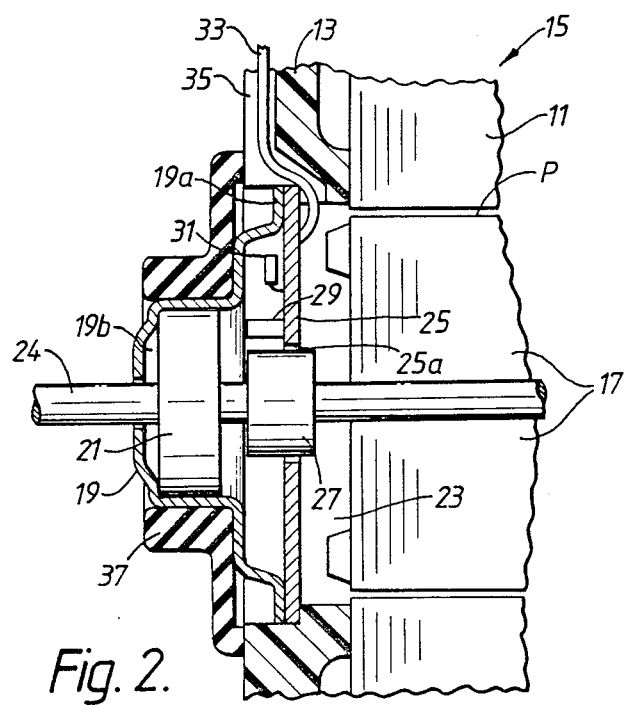
FIG. 2 is a cross-sectional view illustrating a rotation speed detection mechanism with the motor shown in FIG. 1.

In FIGS. 1 and 2, a ring-shaped stator 11 is packed with a resin, which forms a casing 13 of a motor 15. A rotor 17 is rotatably inserted into stator 11. A small gap P is established between the outer surface of rotor 17 and the inner surface of stator 11. A flange 19a formed at the edge of bracket 19 is firmly engaged with the inner surface of casing 13. A recess 19b wherein a bearing 21 is fixed is formed at the bottom portion of bracket 19. A space 23 is defined by one surface 17a of rotor 17 and bracket 19. A shaft 24 penetrates rotor 17 at the rotation center of rotor 17. One end of shaft 24 extends to the outside of bracket 19 through space 23, and is supported by bearing 21. The other end of shaft 24 also is supported by a bearing (not shown).

As shown in FIG. 2, a printed circuit substrate 25 is positioned in space 23. The outer surface of printed circuit substrate 25 is supported by flange 19a of bracket 19 and casing 13. A penetrating hole 25a is formed at the center portion of printed circuit substrate 25, and shaft 24 extends therethrough. A ring-shaped magnet 27 is positioned in hole 25a of printed circuit substrate 25, and is fixed around shaft 24. The outer surface of magnet 27 is polarized with alternating N-poles and S-poles. A Hall-effect element 29, acting as a magnetic sensor, is provided on printed circuit substrate 25 such that Hall-effect element 29 is magnetically engaged with magnet 27. A capacitor 31 is provided on printed circuit substrate 25 for absorbing surge in a circuit. One end of a lead wire 33 is connected to Hall-effect element 29 through printed circuit substrate 25. The other end of lead wire 33 extends to the outside of casing 13 along a guide groove 35 which is formed on the outer surface of casing 13. A vibration-insulator 37 made of rubber is provided on bracket 19. A terminal plate 39 is provided on the outer surface of casing 13, and motor lead wires 41 are connected thereto.

Figure 3:
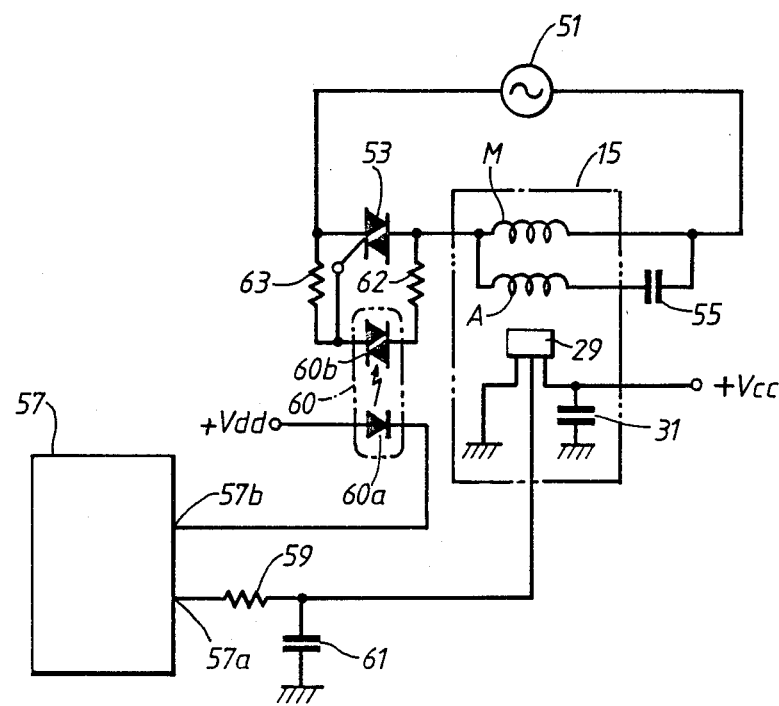
FIG. 3 is a rotation speed control circuit diagram of one embodiment.

FIG. 3 is a circuit diagram of one embodiment. Motor 15 has a main winding M and an auxiliary winding A acting as stator windings. Main winding M is connected to AC power supply 51 through a triac 53. Auxiliary winding A is connected in parallel with main winding M through a starting capacitor 55. DC voltage Vcc is applied to one terminal of Hall-effect element 29 in motor 15 through capacitor 31. An output terminal of Hall-effect element 29 is connected to an input port 57a of a microcomputer 57 through a resistor 59. This output terminal of Hall-effect element 29 is grounded through a capacitor 61. Another terminal of Hall-effect element 29 is grounded. If motor 15 is applied to an air conditioning apparatus, microcomputer 57 controls the operation of the air conditioning appartus. DC voltage Vdd is applied to an output port 57b of microcomputer 57 through a light emitting element 60a, e.g., light emitting diode, of a photo-coupler 60. One terminal of light receiving element 60b, e.g., diac, of photo-coupler 60 is connected to one terminal of triac 53 through a resistor 62. The other terminal of light receiving element 60b is connected to the other terminal of triac 53 through a resistor 63. The gate terminal of triac 53 is connected to the other terminal of light receiving element 60b.

The operation of the circuit shown in FIG. 3 will be described by reference to FIGS. 2 and 3. Magnet 27 attached to shaft 24 of motor 15 rotates when motor 15 is energized. The poles of magnet 27 pass by Hall-effect element 29 sequentially, therefore, the magnetic field around Hall-effect element 29 is varied in response to the rotation of magnet 27. Thus, Hall-effect element 29 detects the rotation of rotor 17, and outputs detection signals representing the rotation speed of rotor 17 to the input port 57a of microcomputer 57. Microcomputer 57 calculates the rotation speed of rotor 17 in accordance with the detection signals from Hall-effect element 29. Based on the calculated value, microcomputer 57 controls triac 53 through photo-coupler 60. Thus, triac 53 is activated within each half-cycle of the AC power supply 51 to cause current to flow. The electric current flowing through main windings M and auxiliary windings A of motor 15 increases or decreases until the rotation speed of rotor 17 detected by Hall-effect element 29 reaches a suitable value.

With the above-described embodiment, since a rotation speed detection mechanism including the magnet and the Hall-effect element is housed in the space defined by the rotor and bracket of the motor, no extra space for the print circuit substrate, on which a Hall-effect element is mounted, is needed, as compared with the conventional motor. Since the lead wire from the Hall-effect element is held in the guide groove of the casing, the lead wire may be firmly supported. The capacitor for absorbing surge is provided for the rotation speed mechanism. Therefore, accuracy of detection by the Hall-effect element may be enhanced. Furthermore, since the magnet and the Hall-effect element are arranged in parallel with one another in the motor no extra length of the rotation shaft is needed, and therefore, it is possible to reduce the total size of the motor.

Figure 4:
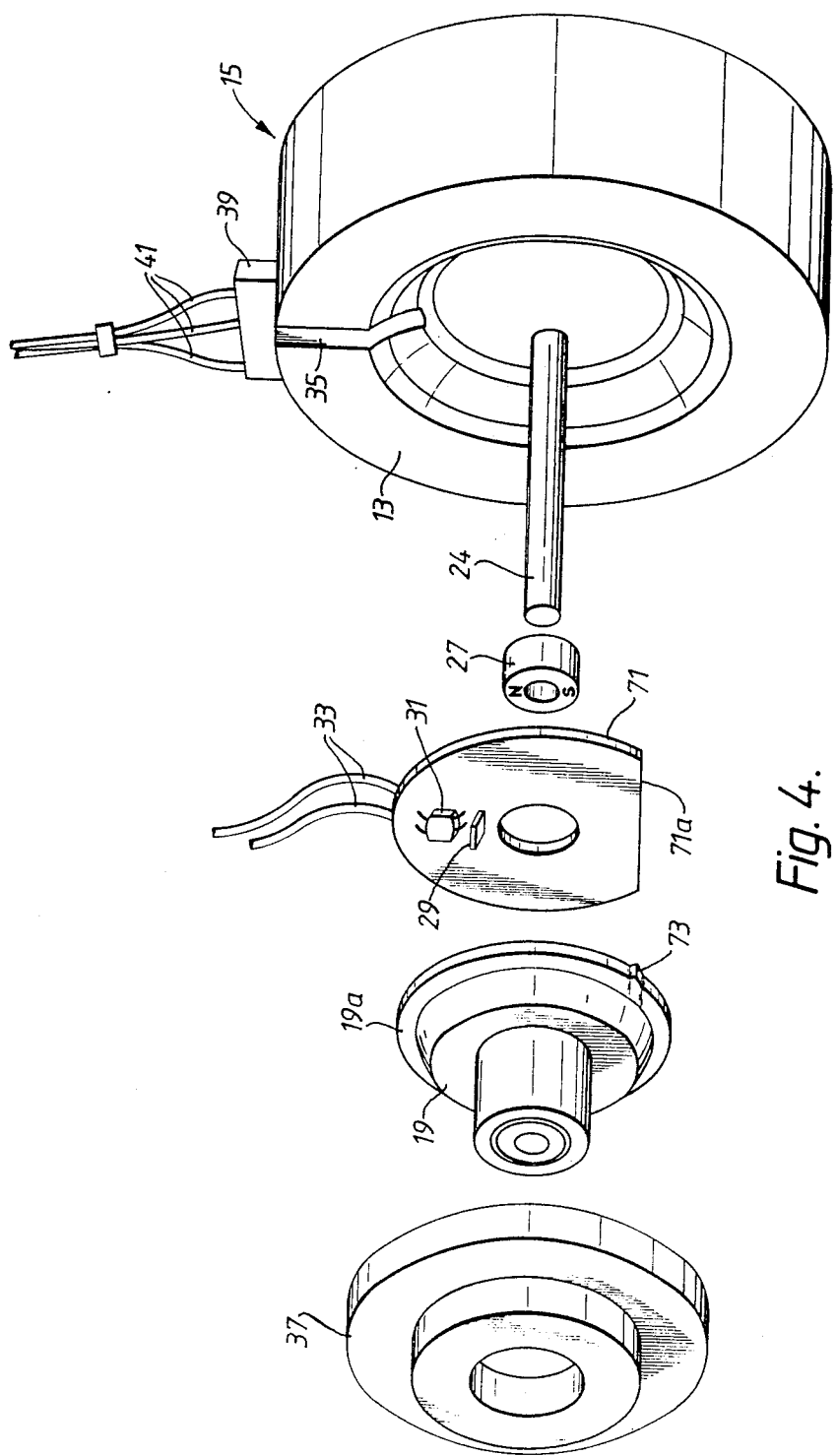
FIG. 4 is an exploded view illustrating a second embodiment of the present invention.

FIG. 4 is an exploded view illustrating a second embodiment of the present invention. In this embodiment, a lower part of a printed circuit substrate 71 is eliminated to establish a flat edge 71a. A projection 73 is integrally formed to an edge portion of flange 19a and bracket 19 corresponding to flat edge 17a of printed circuit substrate 71. Projection 73 of bracket 19 is coupled with flat edge 71a of printed circuit substrate 71 when assembling. Therefore, printed circuit substrate 71 is set at a prescribed position in motor 15.

With the second embodiment described above, since a positioning mechanism including the flat edge of the printed circuit substrate and the projection of the bracket is provided to set the printed circuit substrate at the prescribed position in the motor, a predetermined gap between the magnet and the Hall-effect element may be established when assembling.

In the second embodiment, the projection is formed on the bracket. However, the projection may be formed on the inner surface of the casing which is exposed to the space defined by the rotor and the bracket.

In the above-described embodiments, the present invention is applied to a motor for driving a fan device of an air-conditioning apparatus. However, the present invention may be applied to a rotating device in which the rotation speed is detected, and is controlled to a preset value in accordance with the detection result.

The present invention has been described with respect to specific embodiments. However, other embodiments based on the principles of the present invention should be obvious to those of ordinary skill in the art. Such embodiments are intended to be covered by claims.

What is claimed is:

1. A motor comprising:
    a stator;
    a rotor;
    a rotation shaft extending through the rotor;
    bracket means for rotatably supporting the rotation shaft;
    magnet means disposed on a portion of the rotation shaft between the rotor and the bracket means for generating a magnetic field change in response to the rotation speed of the rotor;
    a printed circuit substrate disposed between the rotor and the bracket means, the printed circuit substrate having a hole, the magnet means being disposed in the hole; and
    magnetic sensing means disposed on the printed circuit substrate close to the magnet means for outputting a sensing signal corresponding to the rotation speed of the rotor when sensing the magnetic field change.

2. A motor according to claim 1, wherein the printed circuit substrate has a contact portion, and the bracket means includes a projection engaging the contact portion of the printed circuit substrate for establishing a predetermined close relationship between the magnet means and the magnetic sensing means.

3. A motor comprising:
    a stator;
    a rotor rotatably positioned in the stator;
    an outer casing holding the stator, the outer casing having an opening for exposing the rotor, the outer casing also having a step portion around the opening;
    a rotation shaft extending from the rotor through the opening of the outer casing;
    bracket means for rotatably supporting the rotation shaft, the bracket means having an outer flange portion adapted to engage the step portion of the outer casing so that said bracket means is supported by the outer casing;
    magnet means disposed on a portion of the rotation shaft between the rotor and the bracket means for generating a magnetic field change in response to the rotation speed of the rotor;
    a printed circuit substrate disposed between the step portion of the outer casing and the outer flange portion of the bracket, the printed circuit substrate having a hole, the magnetic means being disposed in the hole; and
    magnetic sensing means disposed on the printed circuit substrate close to the magnet means for outputting a sensing signal corresponding to the rotation speed of the rotor when sensing the magnetic field change.

* * * * *